March 20, 1951  LA VERN H. DE HAVEN  2,545,769
CYLINDRICAL BAG FILTER ELEMENT
Filed March 27, 1946
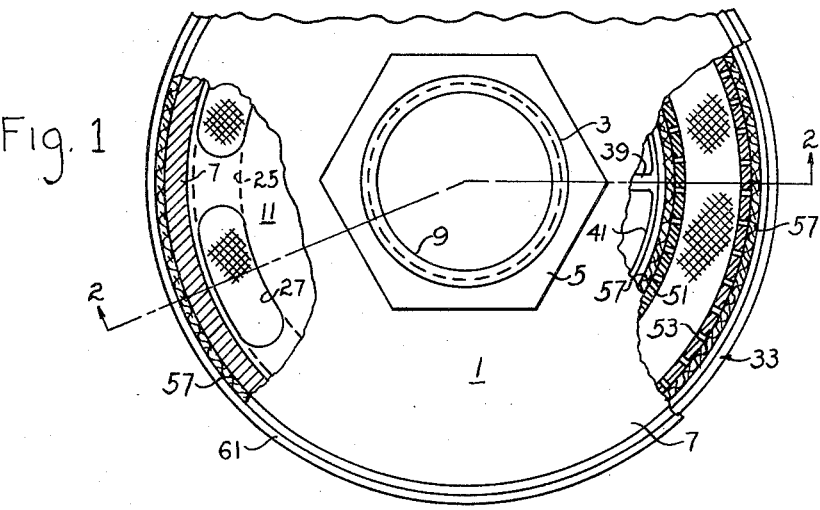
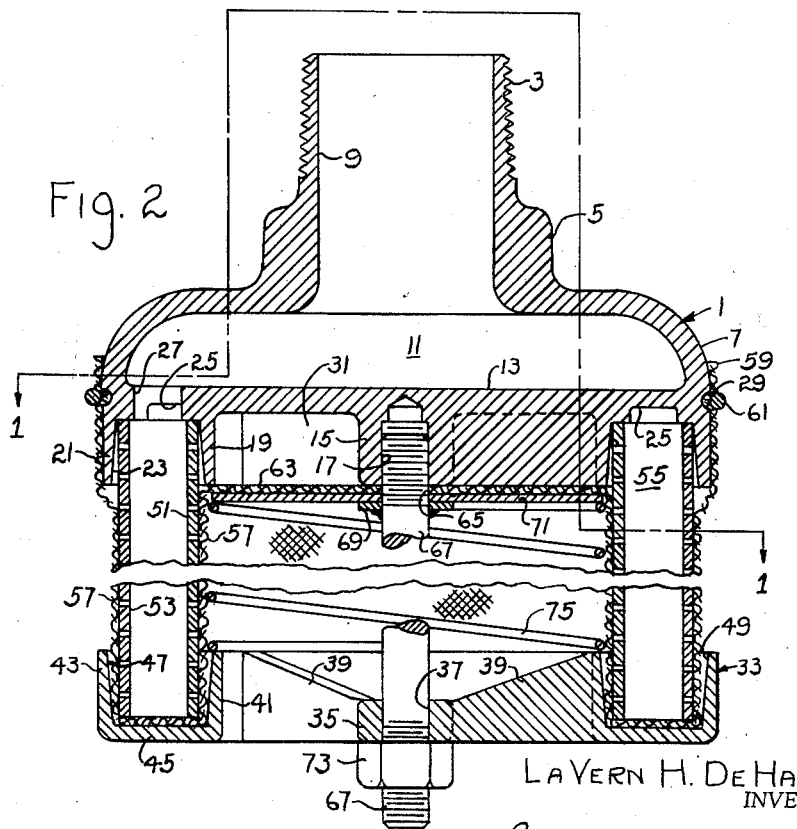
LA VERN H. DE HAVEN
INVENTOR.
BY Edmund W. E. Kamm Patented Mar. 20, 1951

2,545,769

UNITED STATES PATENT OFFICE 2,545,769

CYLINDRICAL BAG FILTER ELEMENT

La Vern H. De Haven, Fort Wayne, Ind., assignor to Bowser, Inc., Fort Wayne, Ind., a corporation of Indiana Application March 27, 1946, Serial No. 657,545

13 Claims. (Cl. 210—170)

This invention relates to a filter element, in particular it relates to a two-sided backwash filter element using cloth as the filter medium proper or as a supporting member for a precoat of filter aid.

It is therefore an object of this invention to provide a bag type filtering element having a large effective filtering area.

It is another object of this invention to provide a bag type filter element having two filtering surfaces.

It is yet another object of this invention to provide a two-sided cylindrical filtering element.

It is still another object of this invention to provide a two-sided cylindrical filtering element using a single cloth bag.

It is still another object of this invention to provide a filter element which is readily demountable.

It is still another object of this invention to provide a filter element having the outlet equidistant to all points of egress from the filtrate collection chamber.

It is still another object of this invention to provide a filter element so constructed as to reduce the filtering back pressure.

It is still another object of this invention to provide a filter element which will effectively backwash over its entire filtering area.

These and other objects will become apparent from a study of this specification and the drawings which are attached hereto and made a part hereof and in which:

Figure 1 is a top view of the filter element with parts broken away substantially on the line 1—1 of Figure 2 and showing the ports, filter elements, bag and outlet.

Figure 2 is a vertical section taken on the line 2—2 of Figure 1 showing the same structure.

Referring to the drawings the numeral 1 designates an outlet head having an externally threaded neck 3 at the top, a hexagon 5 below the threads, and a bell 7 extending out and down from the hexagon. An internal passage 9 extends through the neck and hexagon and connects with a chamber 11 in the bell. The chamber has a bottom wall 13 having a depending central boss 15 which has a blind tapped hole 17 entering from the bottom. Also depending downward from the bottom wall of the chamber is an inner annular flange 19 and an outer annular flange 21 flush with the outside of the bell. Both flanges extend down to the level of the boss 15. A channel 23 extends up between the flanges and tapers to a narrower width at the top. Above this tapered channel is an annular collection channel 25 which communicates with the chamber 11 through the slots or ports 27, which extend through the wall 13. A groove having a semi-circular cross section extends around the outside of the bell substantially on a level with the wall 13. Ribs 31 which are integral with wall 13 extend from the boss 15 and join the inner annular flange 19.

A bottom head 33 has a central boss 35 which is axially perforated at 37. Ribs 39 join the boss with an inner annular flange 41 which is connected to an outer annular flange 43 by a bottom wall 45. An annular channel 47 having walls 49 tapering toward the bottom is formed by the flanges and bottom wall.

A small perforated metal cylinder 51 is disposed concentrically inside of a larger perforated metal cylinder 53 forming an annular channel 55 which is in communication with channel 25. The cylinder 51 is slightly larger in internal diameter than the greatest diameter of flange 41 while cylinder 53 is slightly less in external diameter than the least diameter of flange 43 so as to allow some room for the cloth bag 57 which is supported by the cylinders.

It will be noted that a single bag covers the exposed surfaces of both cylinders. The top end 59 of the bag is open and is clamped to the outlet head by a wire 61 which nests in the groove 29. The bag is extended down over the outside of the larger perforated cylinder, under the bottom ends of both of the perforated cylinders, and up on the inside of the small cylinder. This end of the bag which lies adjacent the top of the inner cylinder is closed as at 63 with the exception of a small hole 65 which permits passage of a tie rod 67 which is threaded on both ends, the one end of which engages the threads 17 in the outlet head. A washer 69 passes over the end of the rod and is welded to the rod below the top threads. The washer freely supports a circular plate 71 which forces the end 63 of the bag up against the boss 15 and the flange 19 of the outlet head. A nut 73 engages the lower threads of the rod and forces head 33 upwardly to draw the unit together, wedging the top end of the cylinders into the tapered channel 23 of the outlet header and wedging the bottom ends of the cylinders and the portion of the bag passing over the bottom ends into the tapered channel 47 of the bottom head.

A helical spring 75 which has a diameter slightly less than the inside diameter of the bag is nested between the plate 71 and the bottom head 33 so that the coils will bear against the small perforated cylinder to support the bag during the backwashing operation.

*Operation*

The element is assembled in an inverted position from that shown in Figure 2.

The outlet head is placed in a holder with the threaded end down. The top ends of the cylinders 51 and 53 are placed in the channel 23. The plate 71 is placed over the top end of rod 67 to rest on the washer 69 and the top end of the rod is inserted through the hole in the end of the bag. The rod is screwed into the tapped hole 17 till the bag is drawn tight against the boss 15 and the flange 19.

The spring 75 is inserted in the bag and the bag is stretched over the bottom ends of the cylinders and up over the outside of the larger cylinder and up on the bell 7 of the outlet header. A wire 61 clamps the bag into the groove 29.

The bottom head is slipped over the bottom end of the rod and the bottom ends of the bag covered cylinders, which enter the channel 47 and the nut 73 is started on the rod and drawn down.

For filtration the element is screwed into a deck plate or header and the element is exposed to liquid under pressure. The element may be used either with or without a filter aid. The liquid passes through the bag adjacent both of the cylinders depositing the foreign matter upon the bag or the filter aid precoat as the case may be. The filtered liquid passes through the perforations in the cylinders and into channels 55 and 25, and enters chamber 11 through ports 27. Passage 9 conducts the filtrate to the outlet side of the deck plate or into the outlet header.

It will be noted that the ribbed construction of the bottom header 33 permits the liquid to contact on two sides of the element.

The element is backwashed by introducing clean liquid under pressure into passage 9 and chamber 11, thence through slots 27 and into channels 25 and 55. The liquid passes through the perforations in the cylinders and washes the solid materials and slimes from the bags. When a filter aid is used, the precoat is washed off with the dirt.

It has been found that a precoat is established over the entire filtering area evenly and to a substantially uniform depth and that upon backwashing, the entire filtering area is cleaned.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter element, the combination of a top head, two spaced, concentric perforated cylinders mounted on said head, a bag disposed to enclose the exposed surfaces and lower ends of said cylinders, means for holding the bag in sealing contact with the head on both sides of said cylinders and means disposed in the bag and within the inner cylinder and constructed so as to force the bag into substantial conformity with said inner cylinder.

2. In a filter element, the combination of a top head, two spaced, concentric perforated cylinders mounted on said head, a bag disposed to enclose the exposed surfaces and lower ends of said cylinders, and means for holding the bag in sealing contact with the head on both sides of said cylinders, a bottom head disposed adjacent the lower ends of said cylinders, means for clamping said bottom head against the cloth and for holding said cylinders in assembled relation on said top head.

3. In a filter element, the combination of a top head, two spaced, concentric perforated cylinders mounted on said head, a bag disposed to enclose the exposed surfaces of said cylinders, and means for holding the bag in sealing contact with the head on both sides of said cylinders, a bottom head, yieldable means on said bottom head and extending into the inner cylinder and inside the bag for urging the bag toward the surface of said cylinder.

4. In a filter element, the combination of a top head, two spaced, concentric perforated cylinders mounted on said head, a bag disposed to enclose the exposed surfaces of said cylinders, and means for holding the bag in sealing contact with the head on both sides of said cylinders, a bottom head, a coil spring resting on said bottom head and extending into the inner cylinder and inside the bag for urging the bag toward the surface of the cylinder.

5. In a filter element, the combination of a top head, two spaced, concentric perforated cylinders mounted on said head, a bag disposed to enclose the exposed surfaces of said cylinders, and means for holding the bag in sealing contact with the head on both sides of said cylinders, a bottom head, a coil spring resting on said bottom head and extending into the inner cylinder and inside the bag for urging the bag toward the surface of the cylinder, and means for clamping said bottom head against the cylinders over the cloth.

6. In a filter element, the combination of a top head, two spaced perforated cylinders concentrically mounted on said head, a cylindrical cloth bag having its closed end disposed in the inner cylinder, and being folded across the ends of said cylinders and drawn up over the exterior cylinder, said bag having a small opening in the closed end, clamping means having a portion extending through said opening to enter said head for holding said bag in sealing engagement with said head, and a bottom head having an annular groove to receive the ends of the cylinders and the bag folded thereacross, said bottom head being mounted on the clamping means.

7. In a filter element, the combination of a top head, two spaced perforated cylinders concentrically mounted on said head, a cylindrical cloth bag having its closed end disposed in the inner cylinder, and being folded across the ends of said cylinders and drawn up over the exterior cylinder, said bag having a small opening in the closed end, means for holding the open end of the bag in sealing contact with the exterior of the head, clamping means in the bag having a part extending through said opening to enter said head for holding said bag in sealing engagement with said head, a bottom head having an annular groove to receive the ends of the cylinders and the bag folded thereacross, said bottom head being mounted on the clamping means, and means on said clamping means for urging the bottom head toward said cylinders.

8. In a filter element, the combination of a top head, two spaced perforated cylinders concentrically mounted on said head, a cylindrical cloth bag having its closed end disposed in the inner cylinder, and being folded across the ends of said cylinders and drawn up over the exterior cylinder, said bag having a small opening in the closed end, a clamping disc disposed in the bag, having a central opening and having a diameter slightly less than the interior diameter of the inner cylinder, disposed to bear against the closed end of said bag, means passing through said openings in the bag and disc and entering said head, said means including an element for holding said bag and disc in position against the head, a bottom head having an annular groove to receive the ends of the cylinders and the bag folded thereacross, said bottom head being mounted on the clamping means, and means on said clamping means for urging the bottom head toward said cylinders and for holding it in place thereon.

9. In a filter element, the combination of a top head, two spaced perforated cylinders concentrically mounted on said head, a cylindrical cloth bag having its closed end disposed in the inner cylinder adjacent the top thereof, and being folded downwardly and across the lower ends of said cylinders and drawn up over the exterior cylinder, said bag having a small opening in the closed end, a clamping disc having a central opening and a diameter slightly less than the interior diameter of the inner cylinder bearing against the closed end of said bag, means passing through the openings in said bag and disc and entering said head for holding said bag and disc in position against the head, and means in said inner cylinder and within the bag for holding the bag against the walls of the cylinder.

10. In a filter element, the combination of a top head, a groove formed in said head and having an inner wall, two spaced perforated cylinders concentrically mounted in said groove, a cylindrical cloth bag having its closed end disposed in the inner cylinder adjacent the top thereof and being passed down the inside of the inner cylinder, folded across the ends of the cylinders and drawn up over the exterior cylinder, a clamping disc disposed in the bag, having a diameter greater than the inner wall and adapted to clamp the closed end of said bag there against, and means for holding the disc in clamping position.

11. In a filter element, the combination of a top head, a groove formed in said head and having an inner wall, two spaced perforated cylinders concentrically mounted in said groove, a cylindrical cloth bag having its closed end disposed in the inner cylinder adjacent the inner wall and being folded across the ends of the cylinders and drawn up over the exterior cylinder, a clamping disc disposed in the bag adjacent the closed end, having a diameter greater than the inner wall and adapted to clamp the closed end of said bag there against, means for holding the disc in clamping position, a bottom head and means on said head for holding the cloth against the ends of the cylinders and the cylinders in place.

12. In a filter element, the combination of a top head, a groove formed in said head and having an inner wall, two spaced perforated cylinders concentrically mounted in said groove, a cylindrical cloth bag having its closed end disposed in the inner cylinder adjacent the inner wall and being folded across the ends of the cylinders and drawn up over the exterior cylinder, a clamping disc disposed in the bag adjacent the closed end, having a diameter greater than the inner wall and adapted to clamp the closed end of said bag there against, means for holding the disc in clamping position, a bottom head and means on said head for holding the cloth against the ends of the cylinders and the cylinders in place, and a yieldable helical element mounted in the bag between said disc and bottom head for holding the bag closely adjacent the inner cylinder.

13. In a filter element, the combination of a top head, a groove formed in said head and having an inner wall, two spaced perforated cylinders concentrically mounted in said groove, a cylindrical cloth bag having its closed end disposed in the inner cylinder adjacent the inner wall and being folded across the ends of the cylinders and drawn up over the exterior cylinder, a clamping disc disposed in the bag adjacent the closed end, having a diameter greater than the inner wall and adapted to clamp the closed end of said bag there against, means forming aligned openings in said head, bag and disc, a tie rod adapted to enter said openings, means for connecting the tie rod to the head for holding the disc in clamping position, a bottom head, means on said head for holding the cloth against the ends of the cylinders and the cylinders in place, and means on the tie rod for forcing said bottom head against said cylinders and cloth.

LA VERN H. DE HAVEN.

REFERENCES CITED

The following references are of record in the file of this patent:

UNITED STATES PATENTS

| Number | Name | Date |
|---|---|---|
| 609,769 | Barr | Aug. 30, 1898 |
| 1,179,157 | Braun | Apr. 11, 1916 |
| 1,563,904 | Kerckhoff | Dec. 1, 1925 |
| 1,836,269 | McKenzie | Dec. 15, 1931 |
| 2,301,120 | Kamrath | Nov. 3, 1942 |

FOREIGN PATENTS

| Number | Country | Date |
|---|---|---|
| 11,700 | Great Britain | July 17, 1897 |
| 320,612 | Germany | Apr. 30, 1920 |